May 27, 1958

C. R. SHUMATE 2,836,390

QUICK OPENING VALVE

Filed Feb. 8, 1955

INVENTOR
Charles R. Shumate

BY
Hart, Shields + Price
ATTORNEYS

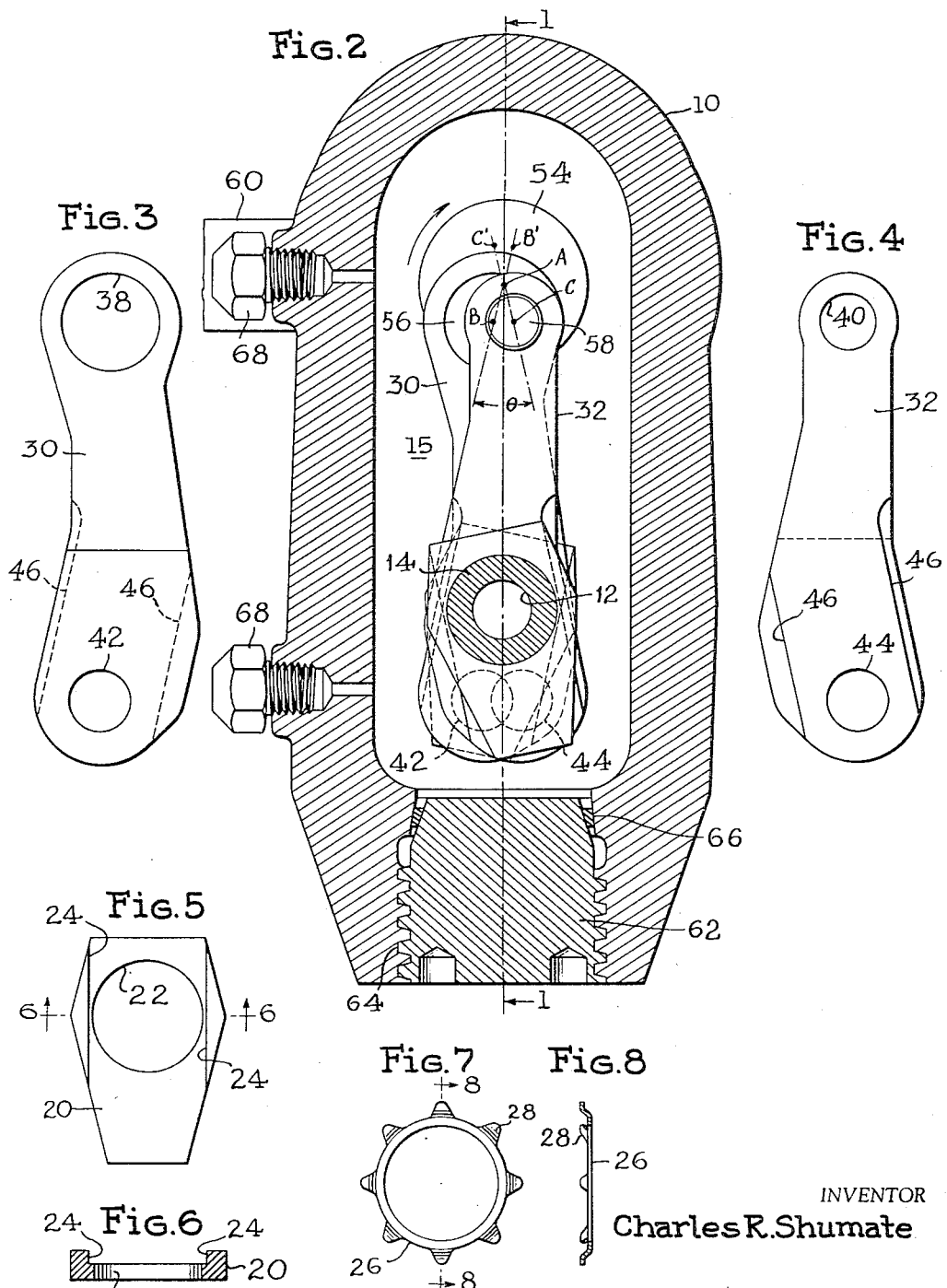

United States Patent Office 2,836,390
Patented May 27, 1958

2,836,390

QUICK OPENING VALVE

Charles R. Shumate, Houston, Tex., assignor, by mesne assignments, to ACF Industries, Incorporated, a corporation of New Jersey Application February 8, 1955, Serial No. 486,830

13 Claims. (Cl. 251—196)

The present invention relates to valves and particularly to gate valves of the quick opening type adapted for high pressure use.

Valves controlling fluids which flow under high pressures must be made so that straight line flow is obtained without any sudden changes of direction. It is also important that the valve parts move so as to maintain, where possible, this straight line flow to eliminate the damage caused by wire drawing. In cases where the fluid contains solids or abrasives it is also important that the chamber containing the valve parts be sealed from the fluid flow path both in open and closed positions. It is also desirable that the flow passage area be reduced as much as is consistent with required flow rate in order to reduce the load on the gate when in closed position. In the present invention these desirable features are obtained as will be apparent from the following description and accompanying drawings in which:

Fig. 2 is a sectional view taken substantially on line 2—2 of Fig. 1.

Fig. 3 is an elevational view of one of the valve parts while;

Fig. 4 is an elevational view of the mating valve part.

Fig. 5 is an elevational view of one of the guide plate members.

Fig. 6 is a sectional view through the guide plate of Fig. 5 and taken substantially on line 6—6 thereof.

Fig. 7 is an elevational view of one of the spring elements mounted behind the guide plates.

Fig. 8 is a sectional view taken substantially on line 8—8 of Fig. 7 and

Figure 1:
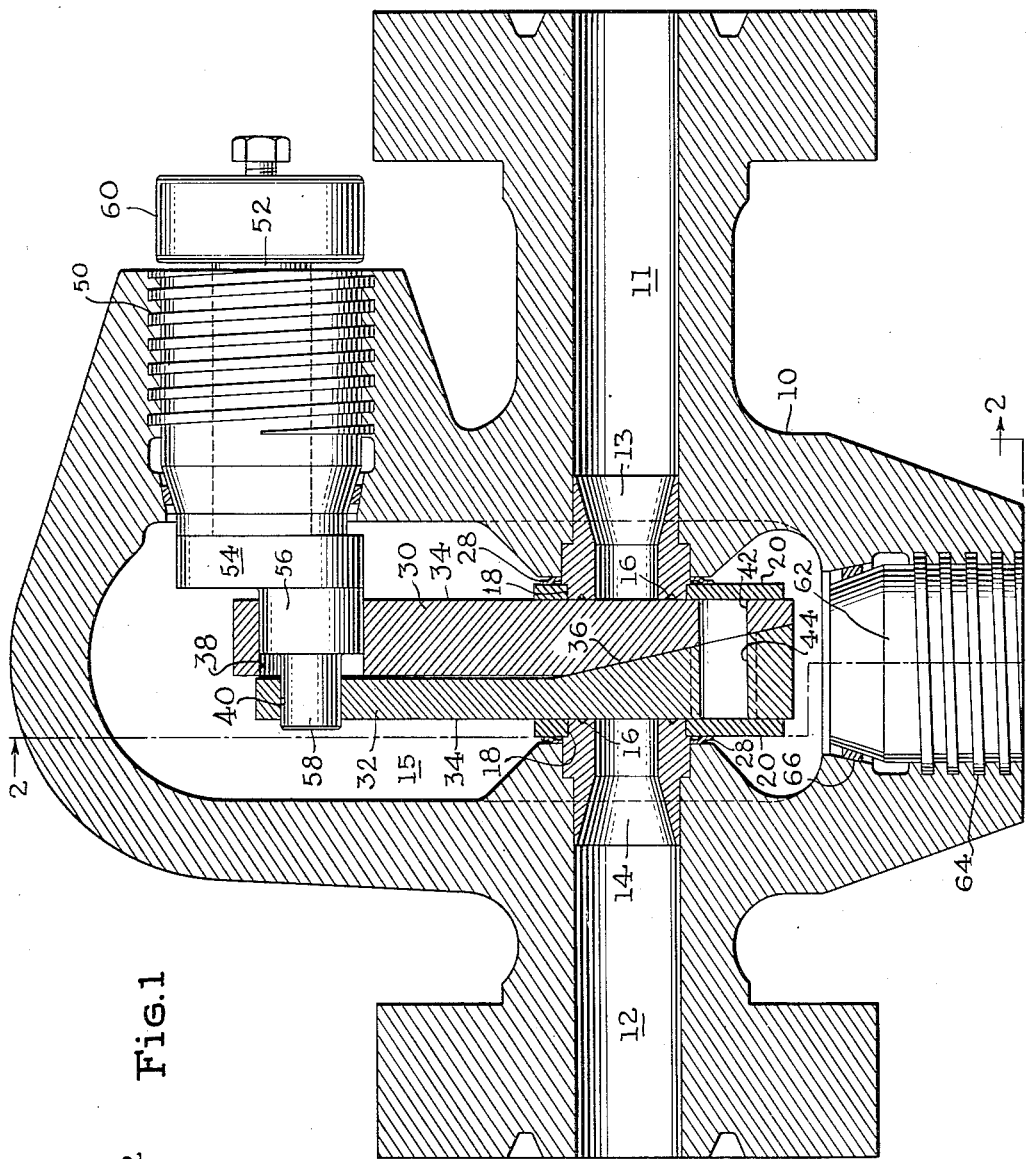
Fig. 1 is a sectional view taken substantially on line 1—1 of Fig. 2.

Referring now to the drawings in detail it will be seen that the housing 10 is formed with an inlet passage 11 and an outlet passage 12 leading from the flanged connections inwardly to the valve chamber 15. The inner ends of the inlet and outlet passages are counter-bored to receive removable valve seat units 13 and 14 pressed, respectively, into the inlet and outlet passages. The inner ends of these valve seats are preferably provided with annular lubricant retaining grooves 16. Also, they project inwardly beyond the inner walls of the housing to provide bearings 18 upon which may be retainably mounted the guide plates 20. These guide plates, as clearly shown in Figs. 5 and 6, are formed with a circular opening 22 adapted to rotate on bearings 18 and are also formed with side guides 24 extending inwardly of the chamber. In order to urge the guide plates inwardly toward the center of the chamber spring elements 26 are provided having spring fingers 28 adapted to bear on the guide plates.

Mounted within the chamber for reciprocation along the guide members and past the seat members are gate parts 30 and 32. The gate parts 30 and 32, as shown in Figs. 1, 3 and 4, are formed with plane faces 34 adapted to slide along and seal with the adjacent seat members 13 and 14, respectively. They are also formed on their lower inner faces with inclined surfaces 36 adapted to mutually inter-engage so as to control axial movement between the gate parts. The upper end of gate part 30 is formed with a relatively larger circular opening 38 while the upper end of gate part 32 is formed with a relatively smaller circular opening 40. The lower ends of valve parts 30 and 32 are directed to one side of a vertical line through the part and provided with port openings 42 and 44, respectively. The side edges of each valve part are machined to provide guide surfaces 46 properly spaced to fit between the guides 24 formed on the guide plates 20. The guide surfaces of gate part 30 are inclined with respect to the guide surfaces 46 of gate part 32, as clearly shown in Figs. 3 and 4 which are arranged in the position which they occupy in the valve.

Figure 9:
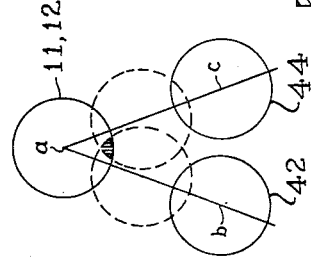
Fig. 9 is a diagrammatic view showing the movement of the various passages from closed to open position.

In order to cause reciprocation of the multi-part gate, the housing is formed with an opening threaded to receive a packing bushing 50 internally bored to receive a shaft 52 extending through the bushing and carrying a shoulder part 54 adapted to prevent blow-out of the shaft from the bushing. The shouldered part 54 has formed thereon a relatively larger crank portion 56 adapted to closely engage within the opening 38 of valve part 30 and this crank part 56 has in turn mounted thereon a smaller crank 58 adapted to closely fit within the opening 40 of valve part 32. As clearly shown in Fig. 2, the center C of crank 58 is offset to one side of the center B of crank 56 and centers B and C offset the same radial distance from shaft center A. The centers B and C are offset equal distances to either side of a reference plane extending, as shown in Fig. 2, vertically through the axis of the flow passages 11 and 12 and through the axis of operating shaft 52. The enclosed angle $\theta$ between lines AB and AC is, in the present case, 25°. As the shaft 52 is rotated in a clockwise direction, as indicated by the arrow of Fig. 2, centers B and C rotate around A to points B' and C', respectively. In other words the center of opening 38 is moved to the opposite side of the reference plane through the shaft and flow passages. In order to compensate for this movement and at the same time give a better flow opening position, the ports 42 and 44 have their centers $b$ and $c$ located to either side of the reference plane and so that the angle between lines $ab$ and $ac$ is the same as angle $\theta$ where $a$ is the axis of the flow passages 11 and 12. Likewise, the guide surfaces 46 will be inclined at an angle so that the centers $b$, $c$ will move along the lines $ab$ and $ac$, respectively. Thus, the ports of the valve parts and the housing passages are out of alignment with each other when the valve is closed. During opening of the valve the guide surfaces 46 and 24 will cooperate to restrain the port openings 42 and 44 so that their centers must move along the lines as stated above. During this movement, as clearly shown in Fig. 9, the ports 42 and 44 will move toward alignment with the flow passages and will, as shown by the dotted position of the ports, provide a through flow passage of circular triangular outline which is shaded in Fig. 9. This circular triangular flow passage will expand as the ports move upwardly and inwardly until it assumes a full circular outline when ports 42 and 44 are in full alignment with flow passages 11 and 12 in full open position of the valve.

As clearly shown in the figures, the inclined surfaces 36 will be in exact alignment and full surface contact during the time the valve parts are in either full open or full closed position. At intermediate position surfaces will not be in full surface contact due to the relative skewing between the parts, but at this time the load on the valve parts has been reduced due to the release of the wedging action. The wedging action between the valve parts 30 and 32 is applied or removed due to the displacement of the crank centers B, C to either side of the reference plane. As clearly shown, the center C of Fig. 2 moving on a circle about A will first lower slightly, but at a much slower rate than will the point B rise. Likewise, when the parts approach the open position the point B' will be lowering at a slower rate than the point C' rises. In other words, the first motion imparted to the valve parts by the cranks will cause a relative movement that releases the wedging and relieves the pressure on the valve seats. Accordingly, it will be seen that each valve part is given three degrees of freedom with the movement substantially at right angles to each other, that is, considered separately the cranks produce a lifting motion or vertical motion while the guide surfaces 24 and 46 cause the part to move transversely of the chamber or flow passages. Also, the wedge surfaces cause the valve parts to move axially of the valve passages at right angles to the first two movements. The guide plates are forced into closed contact with the valve parts by the springs 26 thereby insuring perfect contact and guiding with minimum friction during valve movements.

As clearly shown, the shaft extends outwardly of the valve housing to receive a valve operating handle part 60 and this handle through rotation of the shaft and cranks will control all three degrees of freedom of the valve parts previously described. In order to permit ready removal of the guide plates and valve parts, the lower end of the housing is bored to receive a closure member 62 threaded into the housing as at 64. The upper end of the closure member is tapered at a predetermined angle with respect to the opening in the housing so as to receive a sealing ring 66 which ring will be more tightly wedged into the space to prevent leakage out of the housing. This same type of seal is provided at the bushing 50. The chamber formed in the housing is preferably filled with lubricant supplied through ports closed by plugs 68.

From the preceding description it is believed that the operation of the valve is obvious, but it is to be understood that the specific form and reference to specific angles is merely representative and the relation of parts may be changed without departing from the scope of the following claims defining my invention.

What is claimed is:

1. A gate valve comprising in combination a housing enclosing a chamber and having inlet and outlet passages leading to and from the chamber, a valve seat carried by the housing at the inner ends of said inlet and outlet passages and having the inner face thereof providing a valve seat surface, a multipart gate reciprocable within the chamber transversely of said passages between open and closed positions and having the surfaces adjacent the passages formed to provide seating surfaces cooperable with said valve seat surfaces, separate gate passages extending through each gate part and having their axes offset to either side of a vertical plane extending longitudinally through the housing passages in the closed position of the valve, and means carried by said housing to cause reciprocation of said gate parts within the housing chamber to simultaneously bring said gate passages into alignment with each other and with the inlet and outlet passages in the open position of the valve.

2. A gate valve comprising in combination a housing enclosing a chamber and having inlet and outlet passages leading to and from the chamber, a valve seat carried by the housing at the inner ends of said inlet and outlet passages and having the inner face thereof providing a valve seat surface, a multipart gate reciprocable within the chamber transversely of said passages between open and closed positions and having the surfaces adjacent the passages formed to provide seating surfaces cooperable with said valve seat surfaces, separate gate passages extending through each gate part and having their axes out of alignment with each other and with the housing passages in the closed position of the valve, first means carried by the housing and connected to each gate part to cause reciprocation of the gate parts longitudinally of the chamber, and second means carried by the housing and connected to each gate part to move the same transversely of the chamber and housing passages during reciprocation by said first means.

3. The structure of claim 2 characterized in that said second means moves the gate parts in opposite directions whereby said gate passage axes move from either side of the housing passage toward the axis thereof during opening.

4. The structure of claim 2 characterized in that said gate parts have their adjacent surfaces inclined with respect to the seat surfaces whereby the gate parts are moved axially of the housing passages during relative motion between the gate parts, and that said first means moves the gate parts relative to each other during reciprocation.

5. The structure of claim 2 characterized in that said second means includes guide surfaces on the gate parts and guide plates rotatably carried by the housing within the chamber.

6. A gate valve comprising in combination a housing enclosing a chamber and having inlet and outlet passages leading to and from the chamber, a valve seat carried by the housing at the inner ends of said inlet and outlet passages and having the inner face thereof providing a valve seat surface, a multi-part gate reciprocable within the chamber transversely of said passages between open and closed positions and having the surfaces adjacent the passages formed to provide seating surfaces cooperable with said valve seat surfaces, separate gate passages extending through each gate part and having their axes out of alignment with each other and with the housing passages in the closed position of the valve, and means operable to move the gate parts in three directions substantially at right angles to each other within the housing chamber.

7. A gate valve comprising in combination a housing having inlet and discharge connections communicating with axially aligned inlet and discharge passages leading to and from opposed spaced parallel valve seats, said housing enclosing a chamber surrounding said seats; a valve actuating shaft whose axis is in a common reference plane extending vertically through the axis of said aligned passages, said shaft being mounted in a bearing carried by the housing and having its inner end extending into said chamber; two relatively offset cranks of substantially equal throw carried by the shaft within said chamber and displaced from each other by an inter-crank angle, said shaft having a valve-open and a valve-closed position which are 180° apart and in each of which the reference plane substantially bisects said inter-crank angle; a valve gate interposed between said parallel seats and having parallel external faces presented to respective valve seats, said gate being composed of two parts each of which has a bearing engaging one of said cranks, the two parts mating on a wedging plane which is inclined to the axis of said passages and is substantially at a right angle to said reference plane, there being a port through each of said gate parts which are coaxial with said passages when the shaft is in valve-open position; means affording guide ways, one for each part of the gate and each centered on the axis of said passages; and guides coacting with respective guideways and carried by respective parts of the gate, said guides being inclined to the reference plane in relatively opposite directions and the angle of such inclination being substantially half said inter-crank angle.

8. The combination defined in claim 7 in which the valve seats are formed with trunnions, and the guide ways are formed on plate mounted to rock on said trunnions.

9. The combination defined in claim 7 in which the valve seats project into the chamber and are formed with shouldered trunnions, and the guide ways are formed on plates mounted to rock on said trunnions, and springs are interposed between said plates and the housing to urge the two parts of the valve gate toward one another.

10. The combination defined in claim 7 in which the coaxial inlet and discharge passages and the ports through the valve gate in open position afford a smooth venturi passage whereby streamline flow is favored and it is possible to use for a given flow capacity smaller ports through the valve gate with attendant reduction of crank throw and other dimensions affected thereby.

11. The combination defined in claim 7 in which the bearing which carries the shaft can be axially withdrawn from the housing, and the cranks are overhung, so that the bearing and shaft when withdrawn from the housing disengage the cranks from the parts of the valve gate; and a removable closure is mounted in an opening in the housing through which the parts of the valve gate may be withdrawn from the chamber transversely of the passages.

12. A valve comprising in combination a housing enclosing a chamber and having inlet and outlet passages leading into and out of the chamber, a multi-part valve element movable in the chamber, ports in each part of the valve element, said passages having the axes thereof offset to either side of a vertical plane extending longitudinally through the valve when the valve is in closed position, and means to move said parts relative to each other and to the housing to bring said ports and passages into alignment when the valve is open.

13. The structure of claim 12 characterized in that said passages and ports are circular and the centers thereof are located on the apices of a triangle when the valve is closed and said port centers move along the sides of the triangle between closed and open position and the through flow opening is formed by an expanding circular triangle during opening of the valve merging into a full circle in full open position of the valve.

References Cited in the file of this patent

UNITED STATES PATENTS

| | | |
|---|---|---|
| 146,796 | Wilson | Jan. 27, 1874 |
| 1,084,588 | White | Jan. 13, 1914 |
| 2,002,780 | Laurent | May 28, 1935 |
| 2,537,470 | Laurent | Jan. 9, 1951 |
| 2,583,512 | Laurent | Jan. 22, 1952 |
| 2,666,615 | Laurent | Jan. 19, 1954 |

FOREIGN PATENTS

| | | |
|---|---|---|
| 710,052 | Great Britain | June 2, 1954 |